C. C. MEUTSCH.
CUSHION MAKING MACHINE.
APPLICATION FILED FEB. 14, 1919.

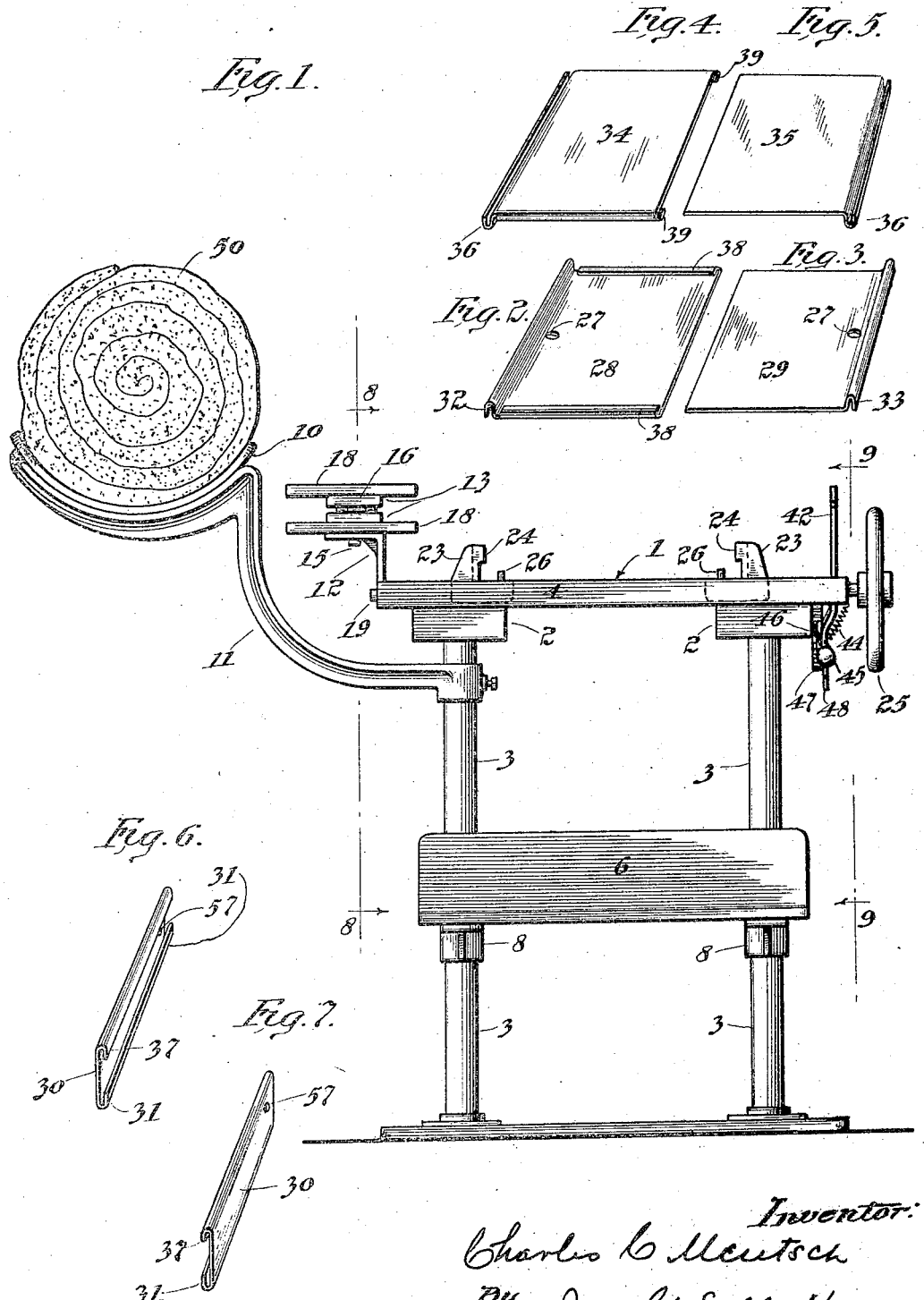

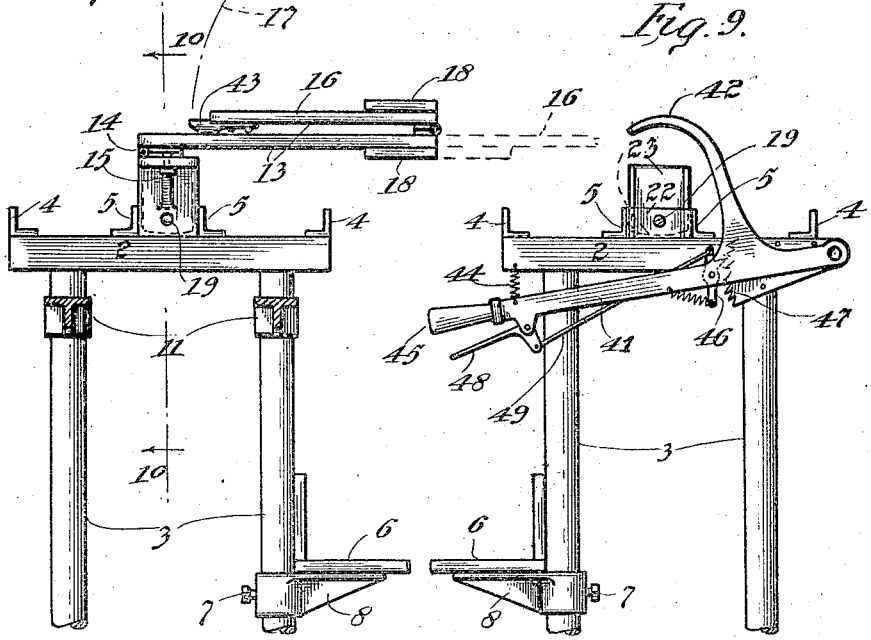

1,414,825.

Patented May 2, 1922.
4 SHEETS—SHEET 3.

Inventor
Charles C. Meutsch
By Jno. G. Elliott Atty.

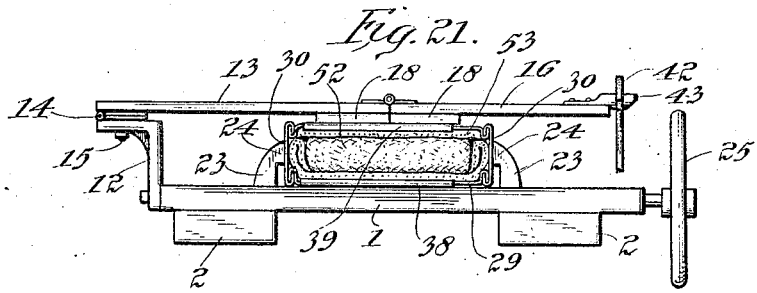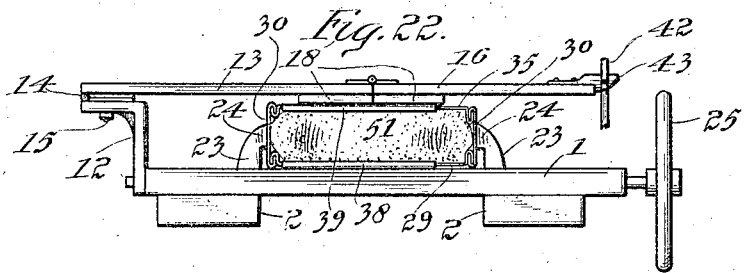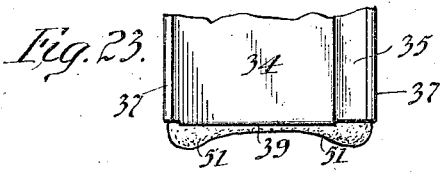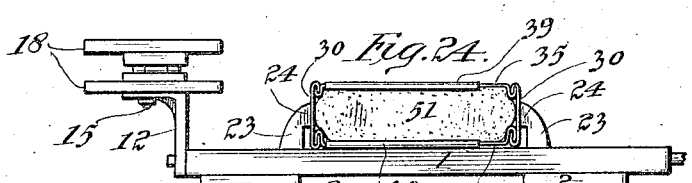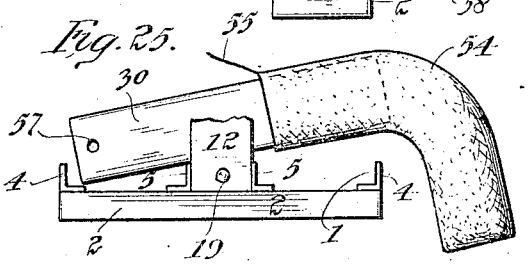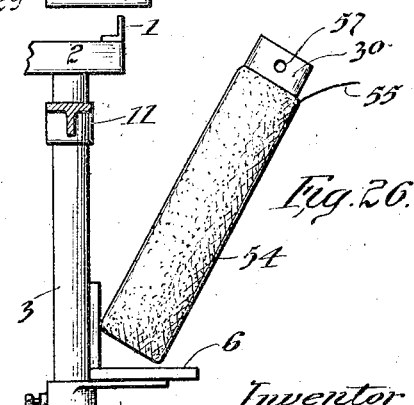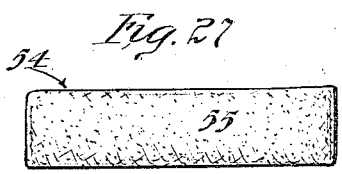

UNITED STATES PATENT OFFICE.

CHARLES C. MEUTSCH, OF CHICAGO, ILLINOIS.

CUSHION-MAKING MACHINE.

1,414,825.	Specification of Letters Patent.	Patented May 2, 1922.

Application filed February 14, 1919. Serial No. 276,966.

*To all whom it may concern:*

Be it known that I, CHARLES CHRISTIAN MEUTSCH, a citizen of the United States, and resident of the city of Chicago, in the county of Cook and State of Illinois, have invented certain new and useful Improvements in Cushion-Making Machines, of which the following is a full, clear, and exact specification.

This invention relates to improvements in cushion-making machines in which a cushion construction consisting of metallic springs and a fibrous stuffing therefor are confined in an open end pan, heretofore consisting of a top member hinged to opposing side members integrally or otherwise permanently connected with the bottom member, and in which the construction is compressed by means of a plunger the force of which is directed through the opposing end edges of and at a right angle to the surfaces of the structure partly sleeved and held by hand in gathers upon the pan, and from which it is gradually pushed, against hand applied resistance, concurrently with the compressing operation of the plunger.

Owing to the very great difficulty, if not impossibility of applying force by hand uniformly resisting a constantly increasing frictional resistance of the cover to the padding, there is unavoidably a disarrangement of its fibrous padding during the compression, producing a number of humps and cavities in the surface of the top, bottom and sides of a cushion, objectionably unsightly and uncomfortable to the user.

In efforts to effect uniform distribution of the padding as far as may be, it has been the common practice to insert the end between the cover and the padding and push the stuffing with the ends of the fingers from the humps into and for filling the cavities and to fill in the corners at the ends of the cushion by pushing additional padding with the ends of the fingers over and between the top and bottom surfaces and over the ends of the padding into the corners of the cover. This practice, however, is obviously unsatisfactory for the reason that one cannot determine with certainty by the feeling of the ends of the fingers when sufficient padding has been added for uniformly distributing the expanding force of the construction over and against the surfaces and side edges of the cover.

The prime object of my invention broadly stated is to provide a cushion-making machine with means for transversely compressing a cushion structure assembled in an open end pan, which pan together with the construction in its compressed state, is adapted to be bodily projected in its entirety within a close and smoothly fitting cover, and to be removed in its entirety therefrom without disarranging the padding or the cover and whereby it is possible and practical to make a box cushion having the desired square effect and finish.

More specifically stated, the object of my invention is a cushion making machine provided with means for transversely compressing a cushion construction assembled in an open end pan, members of which are slidably connected, whereby following the bodily projection of the pan and compressed construction therein in their entirety within a cover close and smoothly fitting the pan, said slidable members may be removed from the cover, the one independently of the other, without disturbing the padding in its compressed arrangement and leaving the cover in a position tightly embracing and smoothly enclosing the padding.

A further object is to provide suitable means for supporting the pan after removal thereof from the compressor in order to facilitate drawing the bag fully thereover.

A further object is to provide a folding arm for cooperation with a compressing lever, which may be readily moved out of the way when the cushion padding is being applied to the cushion frame.

And a further object is to provide a scale suitably arranged for the convenience of the operator in ascertaining when the cushion has been compressed to predetermined dimensions. Other objects will appear hereinafter.

With these ends in view my invention finds its embodiment in certain features of novelty in the construction, combination and arrangement of parts, by which said objects and certain other objects are obtained, all as hereinafter described with reference to the accompanying drawings and more particularly pointed out in the claims.

Fig. 1 is a side elevation of the machine showing all of the operative parts thereof except the cushion pan which is omitted for clearness of illustration.

Figs. 2, 3, 4, 5, 6 and 7 are detail perspective views showing various parts of the cushion pan.

Fig. 8 is a vertical transverse section taken through the machine on line 8—8 of Fig. 1 showing the inoperative position of a folding arm employed in the machine.

Fig. 9 is another vertical transverse section taken on line 9—9 of Fig. 1 showing a compressing mechanism employed in the machine.

Fig. 10 is a vertical longitudinal section taken through the machine on line 10—10 of Fig. 8 showing the mounting and construction of a screw compressor employed in the machine.

Fig. 11 is a detail fragmentary view showing a portion of said compressing mechanism.

Fig. 12 is a fragmentary top plan view showing the manner of mounting a movable jaw on the screw compressor.

Figure 13:
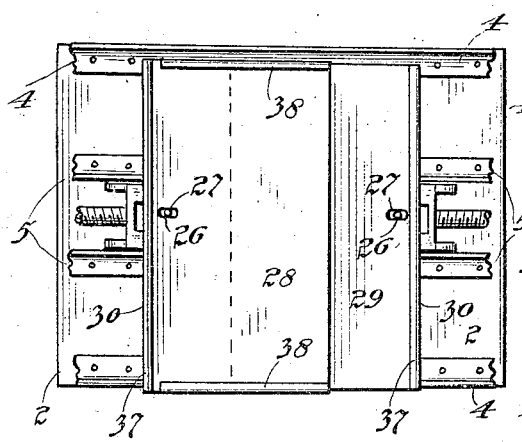
Fig. 13 is a partial top plan view of the machine showing a pan bottom and sides thereof in operative position.

Figs. 15 to 27 inclusive are views showing the several stages of operation in making up a cushion.

And Fig. 28 is a detail perspective view showing a manually operated hook employed for withdrawing pan slides.

The preferred form of construction as shown in the accompanying drawings comprises a rectangular frame 1, which is composed of members 2 supported by legs 3 and surmounted by a plurality of angle members 4 and 5. Secured to the front legs 3 of the machine is a shelf 6 which may be secured in any desired vertical position by means of set-screws 7 extending rearwardly from shelf brackets 8 as clearly shown in Figs. 8 and 9. Another shelf 10 is arranged at the left of the machine and slightly above the level thereof for supporting cotton which is preferably used for padding purposes. Shelf 10 is supported by means of vertically adjustable brackets 11 which are secured to legs 3 in the same manner as brackets 8. A bracket 12 for supporting a folding arm 13 is arranged at the left of the machine directly above brackets 11 and between angle members 5 as shown in Figs. 1 and 8.

Arm 13 is hinged and swiveled to bracket 12, a hinge 14 and bolt 15 being provided for this purpose. Arm 13 is also hinged adjacent the center thereof in order that the free end 16 of said arm may swing in an arc 17, as indicated by dotted lines in Fig. 8, for folding and extending the same. Contact members 18 are secured to the under side of each portion of arm 13 so as to project laterally therefrom as shown in Fig. 1.

A compressor screw 19 having a right-hand thread 20 and a left-hand thread 21 is journaled in bracket 12 at the left of the machine and in a block 22 interposed between members 5 at the right of the machine. Movable jaws 23 having rectangular contact bosses 24 are mounted on screw 19 so as to move to and from each other when said screw is turned by means of a handwheel 25. Said jaws are interposed between members 5, as shown in detail in Fig. 12, there being a slight clearance between the sides of the members 5 in order to permit of a slight oscillation of the jaws for a purpose to be described hereinafter. Projecting upwardly from adjacent the inner ends of jaws 23 are pins 26 for engagement with holes 27 provided in an extensible pan bottom comprising parts 28 and 29 for securing the same in operative position. It will be noted by reference to Fig. 13 that holes 27 are somewhat nearer the rear end of the pan bottom than the front end thereof. The object in thus positioning holes 27 is to permit pan bottom 28 to have a slight tilting movement as shown in Fig. 25.

Figure 20:
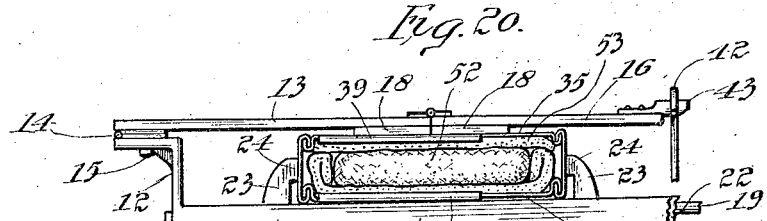
Figure 14:
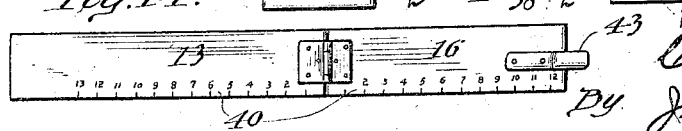
Fig. 14 is a detail top plan view showing a scale provided on the top surface of said folding arm.

Longitudinally movable slides 30 form the sides of the cushion pan and are provided with U-shaped flanges 31 which are interlocked with corresponding flanges 32 and 33 projecting from edges of members 28 and 29 respectively. An extensible pan top composed of members 34 and 35, co-extensive with members 28 and 29, respectively, of the pan bottom, are provided with downwardly extending U-shaped flanges 36 which are adapted to interlock flanges 37. From this construction it is apparent, when the several parts of the pan are assembled as shown in Fig. 20, that the bottom and top members of the pan will be forced together when wheel 25 is turned in the proper direction, as shown in Fig. 22. Flanges 38 and 39 provided on the bottom and top of the pan respectively are obviously for the purpose of guiding the cooperative parts when the pan is moved to extended or contracted position.

Folding arm 13 is provided with a scale 40 on the upper surface thereof for the convenience of the operator in determining the proper dimensions of the cushion which he may be making. In other words said scale serves as an indicator to inform the operator when to stop turning the compressing wheel 25.

In order to force folding arm 13 downwardly for interlocking the pan cover with one of the sides thereof a compressing lever 41 is provided at the right of the machine, there being a curved arm 42 extending upwardly from said lever and formed integral therewith for engaging a finger 43 which projects from the free end of said folding arm as shown in Fig. 8.

Lever 41 is fulcrumed at the right-hand rear corner of the machine and is normally held in an approximately horizontal position by means of a tension coil spring 44 extending from the frame 1 to the free end of said lever. Said lever when depressed by the operator by forcing down the handle 45 is automatically held in any position by means of a spring-pressed pawl engaging a toothed segment 47, a releasing lever 48 being provided to disengage said pawl when it is desired to release folding arm 13.

Figure 15:
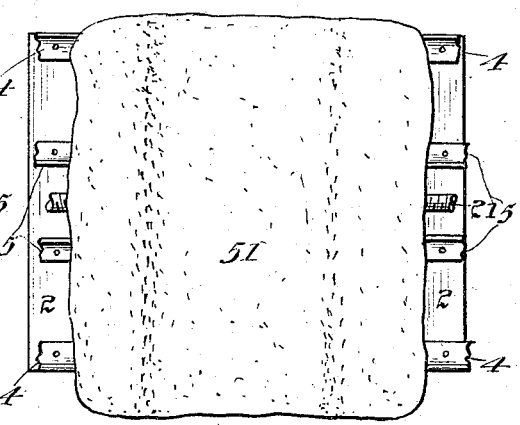
Figure 16:
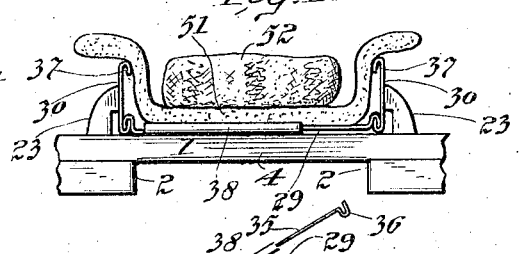
Figure 17:
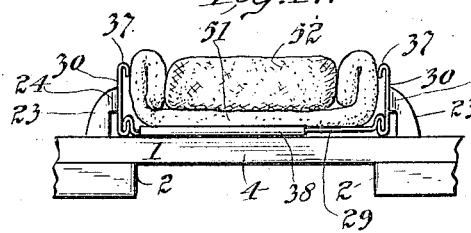
Figure 18:
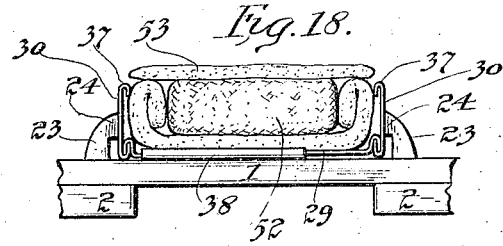
Figure 19:
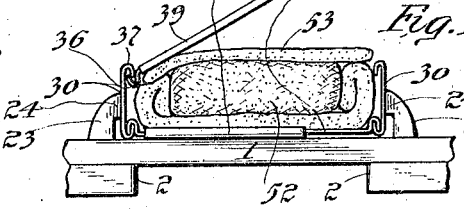

The operation for making a cushion is as follows: Assuming that the pan bottom and sides thereof are positioned as shown in Fig. 13, and that a roll of cotton 50 is available on shelf 10, then a layer 51 of said cotton is arranged on said pan so as to project laterally, forwardly, and slightly to the rear as shown in Fig. 15. The appearance of the cotton on the pan when looking from the front of the machine is shown in Fig. 16, in which figure a cushion frame 52 is shown in position. Fig. 17 shows the lateral edges of the cotton padding turned inwardly and downwardly and tucked securely against the sides of cushion frame 52. A top layer 53, preferably thinner than layer 51, is then positioned as shown in Fig. 18, this figure being a view taken from the front of the machine. The pan cover is then interlocked with one of the sides 30 and forced downwardly into interlocking position with the other side 30 by means of folding arm 13 and lever 41, which operations are clearly shown in Figs. 19 and 20. Fig. 21 shows the cushion after the same has been compressed to the desired degree by turning of hand-wheel 25, it being clear in said figure that the cushion is somewhat narrower than shown in Fig. 20. The forwardly extending portion of cotton 21, shown in Fig. 15, is then turned upwardly and tucked under the front edge of the pan cover. Then the operator manipulates the front surface of the cotton, starting first at the center and working outwardly for forcing a surplus of cotton in the corners, the result of such manipulation being shown in Figs. 22 and 23. Having thus properly arranged the cotton padding, folding arm 13 is then swung to the inoperative position as shown in Fig. 24, whereupon the pan is tilted as shown in Fig. 25. During this tilting movement the jaws 23 are still under compression, and the clearance provided between said jaws and members 5 permits the former to rock slightly during said tilting movement, thus offering no resistance in this operation. A bag or cushion cover 54 provided with a flap 55 is then drawn over the front end of the cushion pan as shown in Fig. 25. Fig. 26 shows the pan removed from the machine and fully inclosed in bag 54, the function of shelf 6 being to facilitate this operation. Hook 56 is then engaged with holes 57 provided in the pan slides for removing the same from bag 54, after which the top and bottom of the pan are removed successively. Due to the fact that the pan parts are separable and removed successively from the bag the slight frictional resistance on the cotton is insufficient to disarrange the same, consequently after the parts of the pan are removed from the cover the resulting cushion retains the original arrangement of the padding. Fig. 27 shows the completed cushion with the flap 55 thereof sewn in position.

Having described my invention what I claim and desire to secure by Letters Patent is:

1. A machine of the type described comprising a portable pan having transversely extensible top and bottom members, slidable sides and means for interlocking the same with said members, means for forcing said top member downwardly into interlocking position with said sides, and means for forcing said sides toward each other, whereby a padded frame contained within said pan will be compressed vertically and horizontally.

2. A machine of the type described comprising a pan having telescoping top and bottom members, removable sides interlocking with said members so as to be free to slide in a direction at right angles to the movement of said members, means for applying pressure to said sides for forcing the same toward each other, and means for forcing said top member downwardly in order to effect interlocking of the same with one of said side members, whereby a padded frame in said pan will be pressed transversely and vertically.

3. A machine of the type described comprising a pan having removable sides and extensible top and bottom members, a screw having a right-hand thread at one end and a left-hand thread at the other, a handwheel for operating said screw, internally threaded jaws mounted on said screw so as to move to and from each other according to the direction of movement of said wheel, means for positioning said pan on said jaws, and mechanism for depressing the pan top members.

4. A machine of the type described a pan for the reception of a padded cushion frame having extensible top and bottom members for said pan having flanges on the longitudinal edges thereof, slidable sides having edge flanges adapted to be interlocked with said first named flanges, lever operated mechanism for forcing said top member downwardly, and a screw compressor for forcing said sides toward each other.

5. A machine of the type described comprising an elongated pan having transversely extensible top and bottom members and slidable sides interlocked therewith, lever operated means for forcing said top member into interlocking position when a padded frame is contained within the pan, and a screw compressor for forcing said sides toward each other for transversely compressing said frame.

6. A machine of the type described comprising an elongated rectangular pan having transversely extensible top and bottom members provided with U-shaped flanges on the longitudinal edges thereof, slidable sides of said pan having U-shaped flanges on the edges thereof for interlocking the flanges of said top and bottom members, said sides being provided with apertures adjacent one end thereof for use in separating the same from said members, and means for moving the latter for compressing a padded frame contained within the pan.

7. A machine of the type described comprising an elongated rectangular pan having open ends, telescoping top and bottom members in said pan interlocked with slidable sides thereof, lever operated mechanism for forcing the pan top member downwardly into interlocking position with one of said sides when a padded frame is contained within the pan, and a screw compressor comprising jaws for engagement with the pan sides, and means for positioning said bottom members, on said jaws.

8. A machine of the type described comprising a contractible pan, a compressor comprising a screw having right-hand threads on one end and left-hand threads on the other, a hand-wheel for operating said screw, jaws mounted on said screw for movement to and from each other, vertical pins provided on said jaws for positioning said pan, there being holes in said pan for the reception of said pins, and lever operated mechanism for applying a downward pressure on said pan.

9. A machine of the type described comprising a contractible pan for the reception of a padded spring frame, said pan comprising a cover having flanges thereon, flanges on the sides of said pan adapted to be interlocked with said cover flanges, a swiveled foldable arm adapted to be positioned over said cover for depressing the same into interlocking position with one of said sides when a padded cushion is contained within said pan, a lever comprising a curved arm for engagement with the free end of said foldable arm, and means for locking said lever for maintaining pressure applied to said cover.

10. A machine of the type described comprising a pan having transversely extensible top and bottom members and longitudinally slidable sides adapted to interlock therewith, a double-action screw and operating means therefor, jaws for clamping said sides mounted on said screw, so as to rock thereon for tilting the pan, a pivoted folding arm having a scale thereon for engaging said top member, a lever having a curved arm for forcing down the free end of said folding arm, and a pawl and segment arranged to cooperate with said lever.

11. A machine of the type described comprising a pan bottom having transversely alined holes arranged nearer the rear end than the front end thereof, means for supporting the front end of the pan, separable pan sides and pan cover, screw-operated jaws for clamping said sides and supporting the central portion of said pan, and pins on said jaws for engaging said holes, said jaws being free to rock for tilting the pan.

In witness whereof, I have hereunto set my hand and affixed my seal, this 12th day of February, A. D. 1919.

CHARLES C. MEUTSCH. [L. S.]

Witnesses:
JNO. G. ELLIOTT,
ALICE OTTREY.